United States Patent [19]
Deseke et al.

[11] Patent Number: 5,567,370
[45] Date of Patent: Oct. 22, 1996

[54] PROCESS FOR THE PRODUCTION OF TPE FOAM PROFILES FOR THE BUILDING AND AUTOMOTIVE INDUSTRIES

[75] Inventors: Otto Deseke, Lehrte; Joachim Meyke, Hannover; Armin Pfeiffer, Celle, all of Germany

[73] Assignee: Hermann Berstorff Maschinenbau GmbH, Hanover, Germany

[21] Appl. No.: 374,109

[22] Filed: Jan. 18, 1995

[30] Foreign Application Priority Data

Jan. 19, 1994 [DE] Germany ............................ 44 01 432.5

[51] Int. Cl.⁶ ................................................. B29C 44/20
[52] U.S. Cl. .................. 264/53; 264/51; 425/208
[58] Field of Search ................... 264/51, 53, 45.9; 425/208

[56] References Cited

U.S. PATENT DOCUMENTS

| | | | |
|---|---|---|---|
| 3,843,757 | 10/1974 | Ehrenfreund et al. | 425/208 |
| 4,103,353 | 7/1978 | Dougherty | 264/45.9 |
| 4,181,647 | 1/1980 | Beach | 264/45.9 |
| 4,190,711 | 2/1980 | Zdrahala et al. | 521/112 |
| 4,302,409 | 11/1981 | Miller et al. | 264/45.9 |
| 4,526,736 | 7/1985 | Searl et al. | 425/207 |
| 4,746,478 | 5/1988 | Fujisaki et al. | 425/208 |
| 5,032,073 | 7/1991 | Moyer, III | 425/208 |
| 5,070,111 | 12/1991 | Dumbauld | 521/82 |
| 5,145,883 | 9/1992 | Saito et al. | 521/172 |
| 5,266,251 | 11/1993 | Jensen | 264/50 |
| 5,334,336 | 8/1994 | Franz et al. | 264/45.9 |

FOREIGN PATENT DOCUMENTS

| | | | |
|---|---|---|---|
| 1529990 | 10/1969 | Germany . | |
| 1569412 | 3/1970 | Germany . | |
| 462131 | 2/1992 | Japan | 425/208 |
| 92/18326 | 10/1992 | WIPO . | |

*Primary Examiner*—Allan R. Kuhns
*Attorney, Agent, or Firm*—Foley & Lardner

[57] ABSTRACT

In a process and apparatus for producing TPE foam profiles, material is heated up in a conveying zone at a temperature of 180°–210° C. and a pressure of 100–200 bar. The melt then passes through a two-stage shear process consisting of two spaced shearing sections separated by a homogenizing section in which the melt and water are intimately mixed, with the melt being exposed to a further homogenizing section in which the melt is intensively mixed and homogenized prior to being extruded through a profile die.

5 Claims, 2 Drawing Sheets

PROCESS FOR THE PRODUCTION OF TPE FOAM PROFILES FOR THE BUILDING AND AUTOMOTIVE INDUSTRIES

BACKGROUND OF THE INVENTION

The invention relates to a process, and apparatus suited to perform the process, for the production of TPE foam profiles (thermoplastic elastomers with an olefin or styrene base, for instance) used in the building and automotive industries for window and door seals, for example.

Physical foaming of TPE foam profiles with a CFC-free blowing agent has not been possible on an industrial scale prior to the present invention. Numerous trials have been carried out in which blowing agents such as water or steam have been used to foam TPE. However, all previous attempts to produce a micro-fine mixture of such blowing agents and TPE have failed. The foam bubbles produced in this manner were either too large or very irregular so that the TPE base material, which is extremely weather resistant and easy to color, has not been capable of being produced industrially with a CFC-free blowing agent.

SUMMARY OF THE INVENTION

It is the task of the invention to provide a process, and an apparatus that is suited to perform the process, by means of which high-quality TPE foam profiles with a very uniform microstructure can be produced without difficulties.

The process of the invention comprises the feeding of TPE pellets into the conveying section of an extruder in which the temperature is 180°–210° C. and the pressure is 100–200 bar thereby melting the pellets, injecting water into the TPE melt, exposing the mixture of melt and water to a zone of intensive shearing action thereby reducing the size of the water drops and distributing the water inside the melt, then intensively mixing and homogenizing the mixture in a zone downstream of the shearing zone, again exposing the mixture to a further zone of intensive shearing action downstream of the mixing and homogenizing zone so as to further reduce the size of the water drops and achieve better distribution of the water inside the melt, exposing the mixture to an intensive mixing section downstream of the further zone of intensive shearing action in order to maintain the mixing quality and produce the desired mixture temperature, and extruding the mixture through a profile die to the desired size and shape.

In the preferred process, the TPE melt is heated up in the conveying section until a temperature of 180° C. is reached. At the same time, the melt pressure inside the extruder is raised to about 100 bar. Water is then injected into the melt in an amount up to 5% by weight of the TPE melt. The mixture of melt and water, which at this point has a pressure of 100–120 bar and a temperature of 180°–190° C., is then subjected to the two-stage shearing process described. This two-stage shearing process leads to a micro-fine distribution of the water inside the melt. The mixture of melt and water is then further exposed to an intensive mixing action as described in order to ensure that the homogeneity previously obtained is maintained. The mixture is eventually shaped in a profile die and left to foam as it leaves the die. After having cooled down, the profile thus produced is wound up.

Physical/chemical examinations of a profile produced in this way have shown that the profile is characterized by a very uniform microcellular structure despite the fact that CFC blowing agents, which are environmentally harmful but still very common in this field, have not been used.

BRIEF DESCRIPTION OF THE APPLICATION DRAWINGS

An embodiment of an apparatus that is suited to perform the process is shown in the application drawings, in which.

DETAILED DESCRIPTION OF THE PREFERRED EMBODIMENTS

Figure 1:
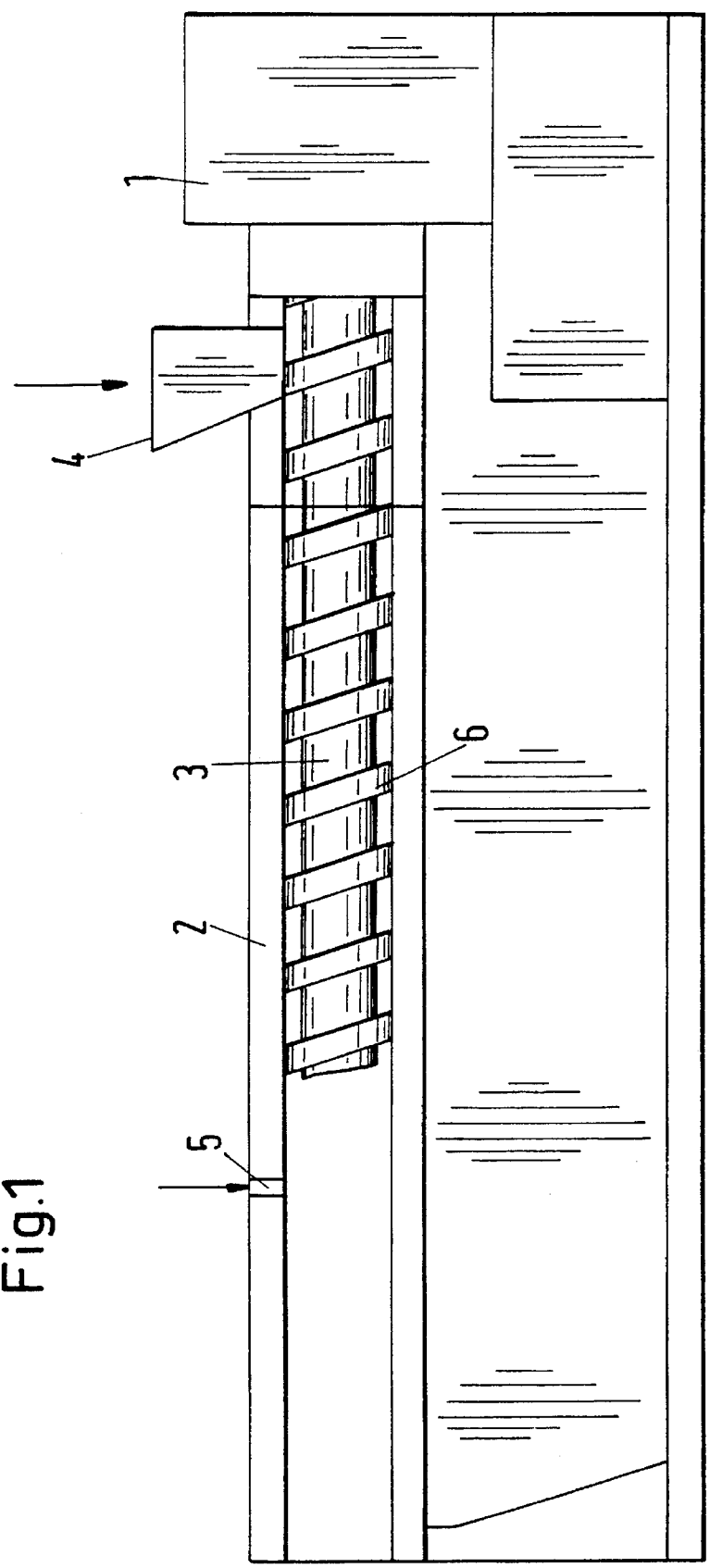
FIG. 1 is a longitudinal section of a schematically illustrated extruder.

The extruder shown in FIG. 1 comprises a drive unit 1, a barrel 2, a screw 3 having flights 6, a plastics feed opening 4 and a water injection valve 5.

Figure 2:
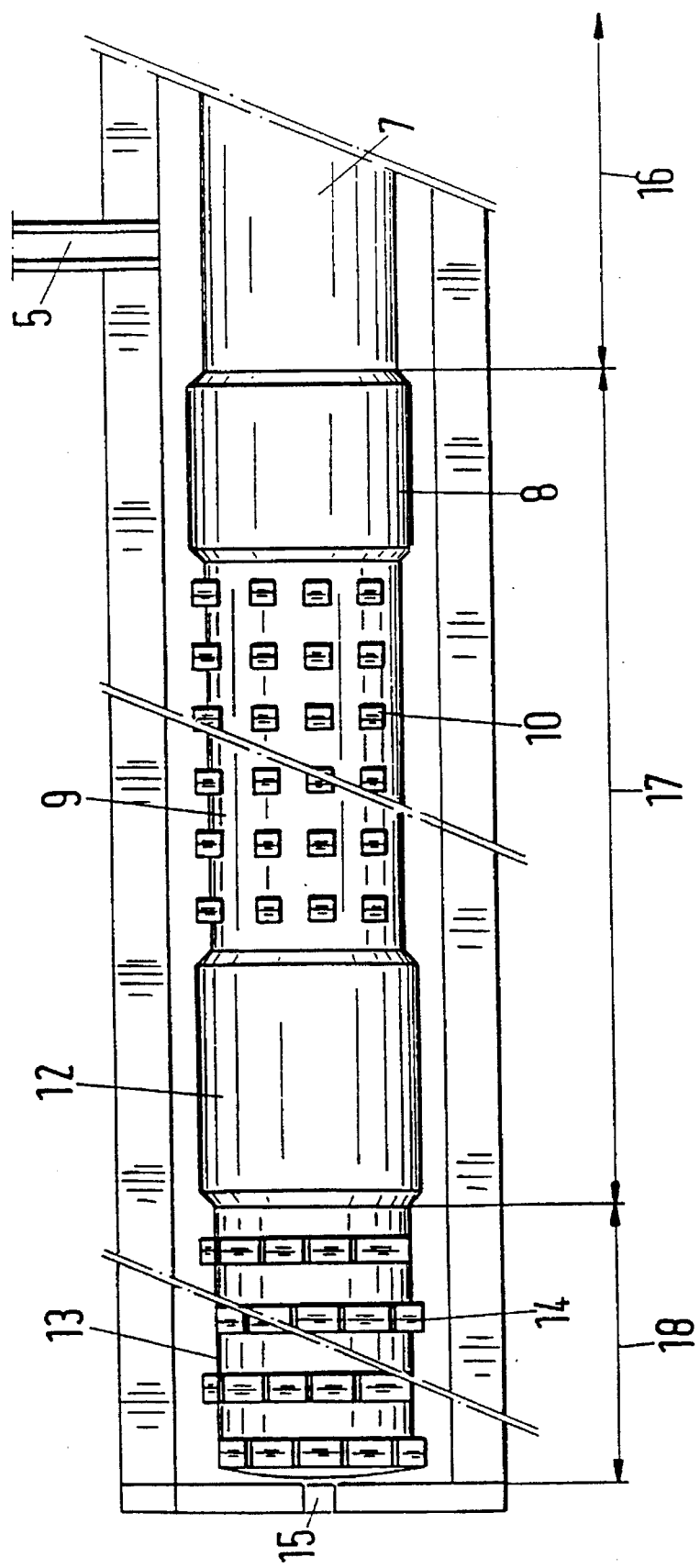
FIG. 2 is a fragmentary longitudinal section of the processing part of the extruder.

Referring to FIG. 2, which illustrates the processing part of the extruder, the injection valve 5 is inserted through the wall of the extruder barrel 2. Water is injected into the melt through the valve 5, and in the area of the injection point the screw is not provided with any flights 6, consisting only of the bare screw root 7. Although a single valve is shown, it will be understood that two or more could be used to obtain the desired results.

Due to the conveying action of the screw in the first extruder section (FIG. 1), the mixture of melt and water is pressed over the first blister 8 (FIG. 2). In the gap between the blister 8 and the inner barrel wall, the mixture is exposed to an intensive shear action which leads to an extremely fine distribution of the water inside the melt. The mixture then enters a central homogenizing zone comprised of a toothed ring section 9 which consists of several rows of toothed rings 10, with the rings in each row being arranged one behind the other. The section 9 is preferably one (1) to four (4) D in length, where D is the screw diameter.

The mixture of TPE melt and water is then pressed over the second blister 12, where it is exposed to a second shear action, which leads to a further reduction in the size of the water drops and thus to an even better distribution of the water inside the melt.

The downstream mixing section 13 is equipped with vertically arranged toothed disks 14 which maintain the mixing quality while at the same time producing the required mixture temperature due to the exchange of heat between the melt and the inner barrel wall. The mixture of TPE melt and water is eventually discharged through the profile die 15. As the profile leaves the die 15, the pressure release causes it to expand to a degree that can be predetermined by the amount of water injected into the melt. The profile is then cooled by means of a cooling unit not shown in the drawing and eventually wound up.

The conveying screw 3 consists of a conveying section 16 in which the material melts, a two-stage shear section 17 comprised of blisters 8 and 12 and the central ringed section 9, in which the melt is sheared and homogenized, and an intensive mixing section 18.

Although only a single two-stage shear section 17 has been illustrated and described, two or more sections could be provided. Similarly, although only a single mixing section 18 has been illustrated and described, additional mixing sections 18 could be arranged between each of a plurality of two-stage shear sections 17. Generally speaking, as the number of two-stage shear sections 17 increases, the length of each homogenizing section 18 interposed therebetween can be shortened.

It will be noted that both the two-stage shear section 17 and the intensive mixing section 18 are shown with broken lines in FIG. 2. This showing is to simplify the drawing figure, and both sections are in fact much larger than shown in FIG. 2. Although not apparent from the drawing, the axial length of each blister 8 and 12 is very small in proportion to the length of sections 9 and 13.

The two-stage shear section 17 is an important feature of the invention, and especially important is the location of water injection valve 5 ahead of the first blister 8 of the two-stage shear section 17. This distance is preferably between 1.2 and 2D, where D is the screw diameter.

A further important dimension is the length of the central toothed ring section 9, also expressed as the distance between blisters 8 and 12. As previously described, the distance is 1–4D, with the optimum distance being 1 to 2D.

The table shown below contains results of tests certain of which have produced excellent TPE foam profiles. The characteristics or features involved in the tests are listed in the left column along with the expression of measurement, and the variables used in each particular test are set forth in columns 1–5. The results of the tests are described below the table. The uniformity of the cells and the cell size were judged on the basis of microsections of the profile.

| Test: | 1 | 2 | 3 | 4 | 5 |
|---|---|---|---|---|---|
| Material temperature °C. | 240 | 240 | 205 | 200 | 190 |
| Material pressure bar | 80 | 80 | 105 | 110 | 120 |
| Screw diameter mm | 90 | 90 | 90 | 90 | 90 |
| Distance between injection point and first blister | 1.2D | 1.2D | 1.5D | 1.5D | 2D |
| Screw speed rpm | 25 | 30 | 35 | 40 | 40 |
| Length of the homogenizing section (18) mm | 720 | 540 | 450 | 400 | 400 |
| Distance between blisters mm | 270 | 270 | 270 | 90 | 180 |
| Number of shear and homogenizing sections (17) | 2 | 3 | 5 | 6 | 8 |

Results

Test 1: Poor incorporation of the water, non-homogeneous and large cells; the temperature is too high, the speed too low and the distance between the blisters too long.

Test 2: Poor incorporation of the water; the speed is too low and the distance between the blisters too long.

Test 3: Large non-homogeneous cells; the profile surface is still too rough.

Test 4: Good incorporation of the water, homogeneous cell structure.

Test 5: Homogeneous cell structure, small cells and good profile surface.

It will be seen that excellent results were achieved in Tests 4 and 5, particularly Test 5.

What is claimed is:

1. A process for the production of foamed TPE profiles in an extruder using water as a blowing agent, the extruder including a conveying screw and being comprised of a conveying section, a two-stage shearing section comprised of spaced blisters and a homogenizing section between said blisters, and a further homogenizing section downstream of said two-stage shearing section, comprising the steps of:

feeding TPE pellets into the conveying section of an extruder in which section the temperature is 180°210° C. and the pressure is 100–200 bar thereby melting the pellets, injecting water in an amount up to 5 percent by weight into the TPE melt prior to the two-stage shearing section, exposing a mixture of melt and water in the two-stage shearing section to intensive shearing and homogenizing action thereby reducing the size of the water drops and finely distributing the water inside the melt, exposing said mixture to an intensive mixing action in said further homogenizing section downstream of said two-stage shearing section, said further homogenizing section maintaining the desired mixture quality and temperature, and extruding the mixture through a profile die to the desired size and shape, and wherein said two-stage shearing section comprises a first blister mounted on the conveying screw, a central toothed ring section, and a second blister downstream of said central section, and wherein the distance between the water injection and the first blister is between 1 and 4D, wherein D is the diameter of the conveying screw.

2. The process of claim 1, wherein two or more two-stage shear sections are provided, interposed between each of which is a homogenizing section.

3. The process of claim 1, wherein the distance between said first and second blisters is 1.2 to 2D.

4. The process of claim 3, wherein the distance between said first and second blisters is 1 to 2D.

5. The process of claim 1, wherein the TPE melt is heated to a temperature of 180°–190° C. and a pressure of 100–200 bar.

\* \* \* \* \*